United States Patent [19]  [11] 3,883,488
Pearson et al.  [45] May 13, 1975

[54] 2-VINYL-(9-DICYANOMETHYLENE) FLUORENE AND DERIVATIVES THEREOF

[75] Inventors: James M. Pearson, Webster; John F. Yanus, Fairport, both of N.Y.

[73] Assignee: Xerox Corporation

[22] Filed: Oct. 31, 1973

[21] Appl. No.: 411,578

[52] U.S. Cl..... 260/78.4 N; 260/465 G; 260/465 H; 260/465 K; 260/78.5 N
[51] Int. Cl. ............................................... C08f 7/02
[58] Field of Search........ 260/465 K, 465 D, 465 H, 260/78.5 N, 78.4 N

[56] References Cited
UNITED STATES PATENTS
3,226,388  12/1965  Hartzler ............................. 260/268
3,637,798  1/1972  Sulzberg et al. .................... 260/465

Primary Examiner—Joseph L. Schofer
Assistant Examiner—John Kight
Attorney, Agent, or Firm—J. J. Ralabate; J. P. O'Sullivan; J. L. Jeffers

[57] ABSTRACT

Disclosed is a composition of matter characterized by the structural formula:

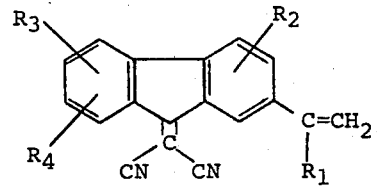

wherein $R_1$ is hydrogen or methyl and $R_2$, $R_3$ and $R_4$ are hydrogen, halogen or aliphatic groups containing 1 to 4 carbon atoms. Also disclosed are vinyl polymers of the above material.

13 Claims, No Drawings

2-VINYL-(9-DICYANOMETHYLENE) FLUORENE AND DERIVATIVES THEREOF

BACKGROUND OF THE INVENTION

The 9-dicyanomethylene derivative of fluorene is known. This compound is prepared by converting the carbonyl group of fluorenone to the dicyanomethylene group. Hovever, this compound cannot be converted into polymers because it contains no site at which polymerization can take place. It would be desirable to prepare polymers of (9-dicyanomethylene) fluorene since this composition is an excellent electrical insulator. This insulating property is conveniently used by dissolving the polymeric composition in a suitable solvent, applying the solution to suitable substrate and evaporating the solvent to leave a film of the insulating meterial. The monomer can be used in the same manner although the mechanical properties of the monomer are such that films of the polymer are preferred.

The prior art has not provided a process for the preparation of 2-vinyl (9-dicyanomethylene) fluorene. This is the case because the necessary intermediate, 2-vinylfluorenone, was not know nor was there available a process for its preparation. A convenient method has now been discovered for the synthesis of 2-vinylfluorenone which can be converted to 2-vinyl (9-dicyanomethylene) fluorene.

It is an object of the present invention to provide, as a novel composition of matter, 2-vinyl (9-dicyanomethylene) fluouene and derivatives thereof.

It is further object to provide a process for preparing 2-vinyl (9-dicyanomethylene) fluorene and derivatives thereof by converting the carbonyl group of 2-vinylfluorenone to the dicyanomethylene group.

A further object is to provide polymers and copolymers of 2-vinyl (9-dicyanomethylene fluorene.

SUMMARY OF THE INVENTION

The present invention involves novel compositions represented by the structural formula:

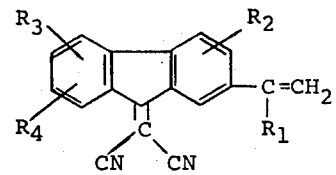

In the above formula, $R_1$ is H or methyl and $R_2$, $R_3$ and $R_4$ are H, halogen or aliphatic groups containing from 1 to 4 carbon atoms. The monomer can be polymerized to form vinyl polymers represented by the formula:

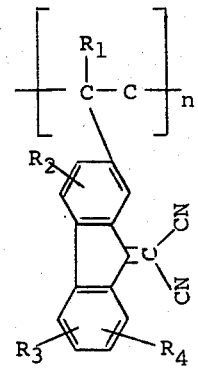

In the above polymeric formula, $R_1$, $R_2$, $R_3$ and $R_4$ are as defined above and n is a number representing the degree of polymerization.

DETAILED DESCRIPTION

The novel compounds of the present invention are characterized by the structural formula:

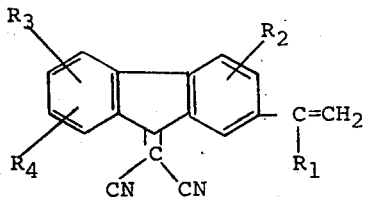

In the above formula, $R_1$ is H or methyl. The remaining constituents, i.e. $R_2$, $R_3$, and $R_4$ are either H or aliphatic groups having independently from 1 to 4 carbon atoms. Examples of $R_2$, $R_3$ and $R_4$ include alkyl or substituted alkyl groups, e.g. methyl, ethyl, chloroethyl, cyanoethyl, propyl, butyl and iosbutyl. In addition, these substituents may be halogen; e.g. bromo, chloro or fluoro or alkoxy groups such as methoxy, ethoxy, propoxy or butoxy. In general, the composition in which the R constituents are H, i.e. 2-vinyl (9-dicyanomethylene) fluorene, is preferred.

These compositions are prepared by reacting a composition of the formula:

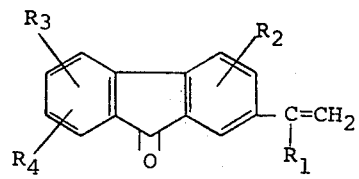

wherein $R_1$, $R_2$, $R_3$ and $R_4$ are as defined above, with malonitrile in the presence of piperidine in a suitable solvent. Suitable solvents include those organic compounds which are liquid at the reaction temperatures and are capable of dissolving both the reactants and products. The starting material, i.e. 2-vinyl fluorenone or derivative thereof is prepared by reacting 2-vinyl fluorene or its corresponding derivative with benzyltrimethyl ammonium hydroxide and oxygen.

After preparation, the 2-vinyl (9dicyanomethylene) fluorene or derivative thereof can be polymerized either by bulk or solution polymerization or emulsion techniques to provide poly-2-vinyl (9-dicyanomethylene) fluorene. This polymerization, which can be initiated either by free radical or cationic initiators can also be used to provide copolymers of 2-vinyl (9-dicyanomethylene) fluorene and other vinyl monomers. Examples of other vinyl monomers which can be copolymerized with the monomers of the instant invention include styrene, vinyl chloride, methyl methacrylate, vinyl carbazole, vinyl naphthalene, isoprene, butadiene, substituted styrenes, acrylonitrile, vinyl pyridine or vinly acetate.

The degree of polymerization which can be obtained will vary depending on the polymerization technique. Generally, a degree of polymerization of up to 500 may readily be obtained and higher degrees of polymerization are possible. A degree of polymerization within the range of from 10 to 500 is typical.

These polymers are generally rather insoluble in common organic solvents; however, they have been found to be soluble in hexafluoroisopropanol and can be applied to conductive substrates from this solvent to provide insulating films.

The invention is further illustrated by the following examples in which all percentages are by weight unless otherwise specified.

EXAMPLE I

Synthesis of 2-vinylfluorene is carried out as follows:

Triphenylmethyl phosphonium bromide (36 gms/0.1 mole) in 500 milliliters of dry THF is treated under nitrogen with 90 milliliters of 1.1 molar solution of n-butyl lithium in hexane and stirred for 2 hours. A solution of 19.4 gms. (0.1 mole) of fluorene-2-carboxaldehyde in 100 milliliters of THF is added dropwise and the final mixture refluxed for 1½ hours. One liter of hexane is added to the cold solution and the precipitate filtered off. The filtrate is evaporated and the residue chromatographed on alumina (Woehlm neutral) using hexane to give 15 gms. (75% theory) of product. Recrystallization from hexane yields 2-vinylfluorene as colorless plates. The structure of the product is confirmed by nuclear magnetic resonance and elemental analysis.

EXAMPLE II

Synthesis of 2-vinylfluorenone is accomplished as follows:

The 2-vinylfluorene prepared in Example I is dissolved in 900 milliliters of pyridine and cooled to 0°centigrade. One-half milliliter of a 40% solution of benzyltrimethyl ammonium hydroxide in pyridine is slowly added with air being bubbled through the reaction solution. The initially formed red coloration fades over a period of 1 to 2 hours and the solution is poured into water and extracted with benzene to yield 9 grams (90% theory) of a yellow solid. The residue is chromatographed on alumina (Woehlm basic) and eluted with benzene. Recrystallization from hexane gives 2-vinylfluorenone as a pale yellow material (melting point 69°–70°C.). The structure of the product is confirmed by nuclear magnetic resonance and elemental analysis.

EXAMPLE III

Synthesis of α-methyl-2-vinylfluorenone is accomplished by acetylation of fluorene as described in Organic Synthesis, Collective, Vol. 3, p. 23. Conversion to the vinyl derivative is achieved in a 70% yield using the procedure described in Example I. Recrystallization of the product from hexane gives α-methyl-2-vinylfluorene as tan crystals (m.p. 155°–156°C.). The product is oxidized to the corresponding fluorenone derivative by the procedure described in Example II. Recrystallization of the product from hexane yields α-methyl-2-vinylfluorenone as pale yellow crystals (m.p. 76°–77°C.). The structure of the product is verified by nuclear magnetic resonance and elemental analysis.

EXAMPLE IV 2-vinyl (9-dicyanomethylene) fluorene is prepared as follows:

The 2-vinylfluorenone prepared in Example II (10 gms./0.05 moles) and malonitrile (10 gms./0.2 moles) are dissolved in 250 milliliters of methanol. Addition of a few drops of piperidine results in the formation of a deep red solution from which a brown solid precipitates. This solid is filtered and recrystallized from acetonitrile to give 9 gms. (90% theory) of 2-vinyl (9-dicyanomethylene) fluorene as red-brown acicular crystals. These crystals were found to have melting points of 213°–215°C. Their structure was confirmed by nuclear magnetic resonance and elemental analysis.

EXAMPLE V

α-methyl-2-vinyl (9-dicyanomethylene) fluorene is prepared by treating α-methyl-2-vinylfluoreneone prepared as in Example III in the manner described in Example IV for the conversion of 2-vinylfluorenone to 2-vinyl (9-dicyanomethylene)fluorene.

EXAMPLE VI 2-vinyl (9-dicyanomethylene) fluorene is polymerized as follows:

In a polymer tube is placed 0.25 gm. (.001 M) 2-vinyl (9-dicyanomethylene) fluorene together with 0.04 gm. (2.5 × 10⁻⁴ M) of AIBN and 5 milliliters of toluene. The tube is degassed, sealed and heated at 75°C. for 24 hours. The cooled tube is opened and its contents precipitated into methanol. The resulting polymer which is soluble in hexafluoroisopropanol is found to have a molecular weight, $M_n$, of approximately 10,000.

The polymers of the instant invention possess excellent dielectric and insulating properties making them ideal materials for use in thin polymer film capacitors. Furthermore, the polymers exhibit good thermal stability at elevated temperatures. The polymers can be used to fabricate capacitors using either solvent coating or in situ polymerization techniques.

EXAMPLE VII

A solution of the polymer prepared in Example VI is prepared by dissolving the polymer in hexafluoroisopropanol. The solution is coated on thin aluminum foil using a doctor blade technique and the solvent evaporated to provide a polymer film approximately 2.5 μ thick.

This metal/insulator sheet is cut into units of the desired dimensions; two of which are positioned so as to allow contact leads to be attached, rolled into a compact cylinder and potted in an epoxy type resin to produce a functioning capacitor.

EXAMPLE VIII

A standard paper/aluminum foil capacitor is impregnated with a solution of 2-vinyl (9-dicyanomethylene) fluorene in hexafluoroisopropanol. The monomer is polymerized using heat as the stimulus and potted as previously described to provide the finished capacitor.

What is claimed is:

1. A composition of matter characterized by the structural formula:

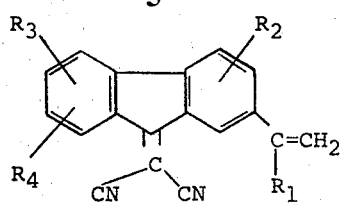

wherein $R_1$ is H or methyl and $R_2$, $R_3$ and $R_4$ are H, halogen or aliphatic groups having from 1 to 4 carbon atoms.

2. The composition of claim 1 wherein $R_1$ is hydrogen.

3. The composition of claim 2 wherein $R_2$, $R_3$ and $R_4$ are hydrogen.

4. The composition of claim 1 wherein $R_2$, $R_3$ and $R_4$ are bromine, chlorine or fluorine.

5. The composition of claim 1 wherein $R_2$, $R_3$ and $R_4$ are independently alkyl, substituted alkyl, or alkoxy.

6. A method of preparing a composition of matter characterized by the structural formula:

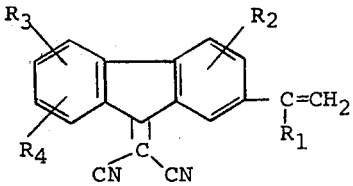

wherein $R_1$ is hydrogen or methyl and $R_2$, $R_3$ and $R_4$ are hydrogen or aliphatic groups containing 1 to 4 carbon atoms which comprises reacting, in a suitable solvent, a composition characterized by the structural formula:

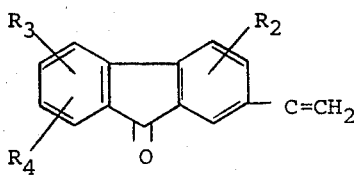

wherein $R_1$, $R_2$, $R_3$ and $R_4$ are as defined above with malonitrile in the presence of piperidine to convert the carbonyl group to a dicyanomethylene group.

7. The method of claim 6 wherein $R_2$, $R_3$ and $R_4$ are H.

8. The method of claim 7 wherein $R_1$ is H.

9. The method of claim 8 wherein the solvent is methanol.

10. A homopolymeric composition characterized by the structural formula:

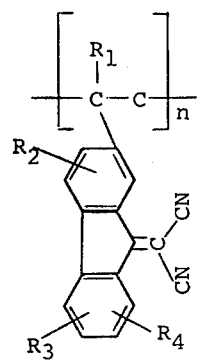

wherein $R_1$ is hydrogen or methyl; $R_2$, $R_3$ and $R_4$ are hydrogen or aliphatic groups having from 1 to 4 carbon atoms and $n$ is a number representing the degree of polymerization.

11. The polymeric composition of claim 10 wherein $n$ is a number within the range of from 10 to 500.

12. The polymeric composition of claim 10 wherein $R_2$, $R_3$ and $R_4$ are H.

13. The polymeric composition of claim 12 wherein $R_1$ is H.

* * * * *

UNITED STATES PATENT AND TRADEMARK OFFICE
CERTIFICATE OF CORRECTION

PATENT NO. : 3,883,488
DATED : May 13, 1975
INVENTOR(S) : James M. Pearson and John F. Yanus It is certified that error appears in the above-identified patent and that said Letters Patent are hereby corrected as shown below:

Column 1, line 30, --fluouene-- should be "fluorene".

Column 1, line 36, --(9-dicyanomethylene fluorene.-- should be "(9-dicyanomethylene) fluorene".

Column 2, line 22, --iosbutyl-- should be "isobutyl".

Column 2, line 65, --vinly-- should be "vinyl".

Signed and Sealed this second Day of September 1975

[SEAL]

Attest:

RUTH C. MASON
Attesting Officer

C. MARSHALL DANN
Commissioner of Patents and Trademarks